United States Patent [19]
McCallum

[11] 3,764,077
[45] Oct. 9, 1973

[54] MATERIAL SPREADER WITH ROTARY FLAIL STRUCTURE

[75] Inventor: Donald A. McCallum, Burlington, Ontario, Canada

[73] Assignee: International Harvester Company, Chicago, Ill.

[22] Filed: May 26, 1971

[21] Appl. No.: 147,108

[52] U.S. Cl. ............................. 239/674, 222/178
[51] Int. Cl. ............................................. A01c 3/06
[58] Field of Search ....................... 222/177, 178; 239/658, 671, 674, 680

[56] References Cited
UNITED STATES PATENTS
3,186,460  6/1965  Frederick................. 239/680 X
3,610,473  10/1971  Hochstetler................. 222/178
3,420,452  1/1969  Vaughan................... 222/178 X Primary Examiner—Robert B. Reeves
Assistant Examiner—Thomas E. Kocovsky
Attorney—Floyd B. Harman

[57] ABSTRACT

A material spreader adapted for towing behind a tractor for spreading a load of manure onto the ground. The spreader includes a tank-like container in which a rotary flail structure is operative to throw the material laterally over a side thereof. An auger conveyor is disposed along the side of the container in position to receive the material from the flail structure and convey the same rearwardly into a discharge chamber adjacent to the container. The chamber includes a laterally directed discharge opening through which the material is thrown by a rotor disposed within the chamber.

13 Claims, 6 Drawing Figures

Patented Oct. 9, 1973

INVENTOR
DONALD A. McCALLUM
BY Neal C. Johnson
ATT'Y

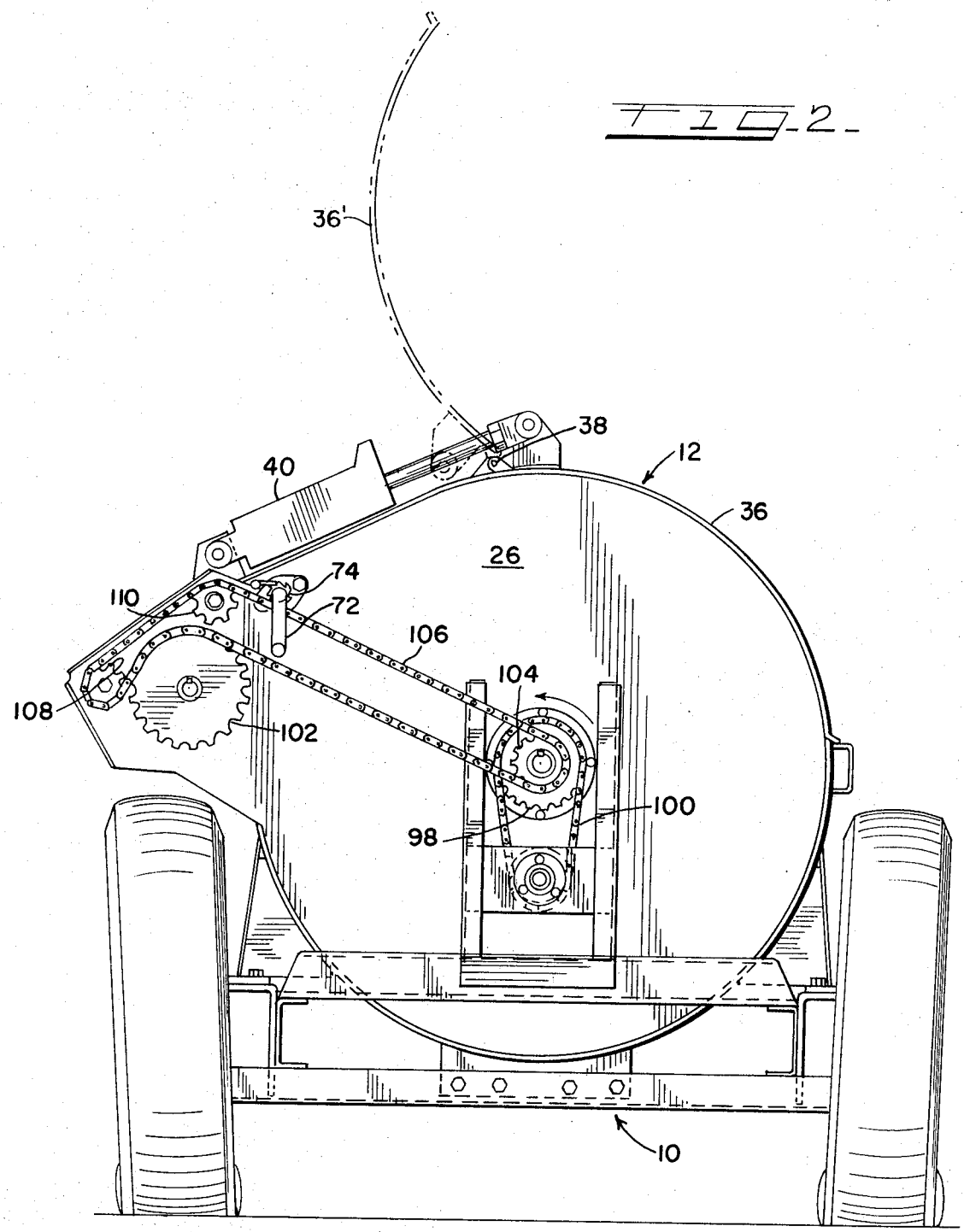

Patented Oct. 9, 1973
3,764,077
3 Sheets-Sheet 3
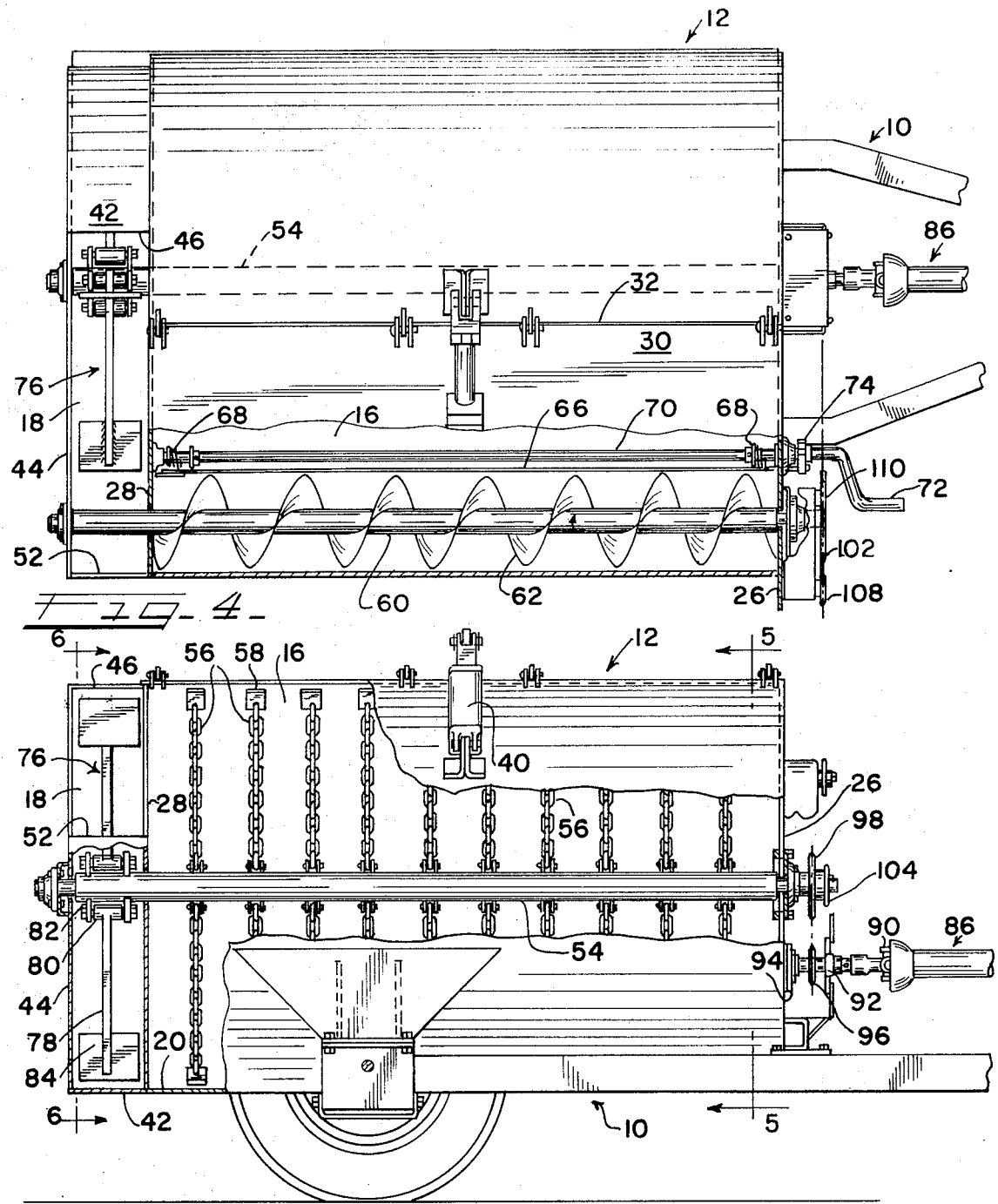
INVENTOR
DONALD A. McCALLUM
BY Neal C. Johnson
ATT'Y

MATERIAL SPREADER WITH ROTARY FLAIL STRUCTURE

BACKGROUND OF THE INVENTION

1. Field of the Invention

The invention relates generally to spreaders for bulk material and more particularly to a mobil spreader for carrying manure and spreading the same onto the ground.

2. Prior Art

Spreaders have been developed which utilize a tank-type container and a rotary flail structure which operates to throw the material over a side wall of the container onto the ground. The flail mechanism includes a plurality of flexible elements such as chains secured at spaced intervals on a shaft disposed longitudinally through the container. Initial rotation of the shaft causes the chains to wrap themselves around the shaft. As the shaft continues to rotate, centrifugal force acts to extend the ends of the chains into engagement with the material next adjacent to the shaft to throw the material from the container.

The material is unloaded progressively outwardly from the shaft and the effective length of the chains increases until the chains are fully extended to engage the material adjacent to the walls of the container. Thus, the effective length or radial extent of the chains is continually increasing throughout the unloading procedure. While the above described spreader is effective in unloading the material, some problems may exist in the ultimate pattern of distribution of the material on the ground.

It is preferred that the material be distributed in a uniform pattern for optimum utilization by the soil of the nutrients in the fertilizer being spread. In a spreader of the above type however, the material is thrown from the container by the chains as the same are increasing in effective length. Accordingly, the material is thrown at varying distances from the container commensurate with the degree of extension of the chains from the shaft. The result can be a non-uniform pattern of distribution of the material.

SUMMARY

The invention provides an improved material spreader wherein the material in a load-carrying container is progressively transferred therefrom onto an auger conveyor which conveys and meters the material into a discharge chamber which includes a rotor assembly for throwing the material from the spreader. The load-conveying capacity of the auger conveyor is selectively variable to provide an optimum flow or movement of the material into the discharge chamber in accordance with possible variations in the density or consistency of the material.

The rotor assembly in the discharge chamber is arranged so that the effective length of the throwing elements does not vary to any significant extent during the unloading operation. This results in minimizing variations in the distance through which the material is thrown from the spreader for any given constant speed during operation. The ultimate result is a more uniform spread pattern of the material on the ground.

An object of the invention is to provide a material spreader which unloads the material onto the ground in a uniform pattern.

Another object is to provide a spreader which includes a rotary discharge mechanism to which the material is fed in a relatively uniform flow thereby promoting smooth and uniform discharge.

Yet another object is to provide a spreader in which the material-conveying capacity of the means feeding the discharge mechanism is selectively variable to compensate for variations in the density or consistency of the material.

Another object is to provide a spreader which is of simple, compact construction, easy and convenient to load and readily adaptable for operation behind a conventional agricultural tractor.

BRIEF DESCRIPTION OF THE DRAWINGS

FIG. 2 is a front elevation view of the spreader of FIG. 1;

FIG. 3 is a fragmentary side elevation view of the spreader with portions broken away to show details of construction;

FIG. 4 is a fragmentary plan view of the spreader with portions broken away to more clearly show the details of construction;

DESCRIPTION OF PREFERRED EMBODIMENT

Figures 1, 5, 6:
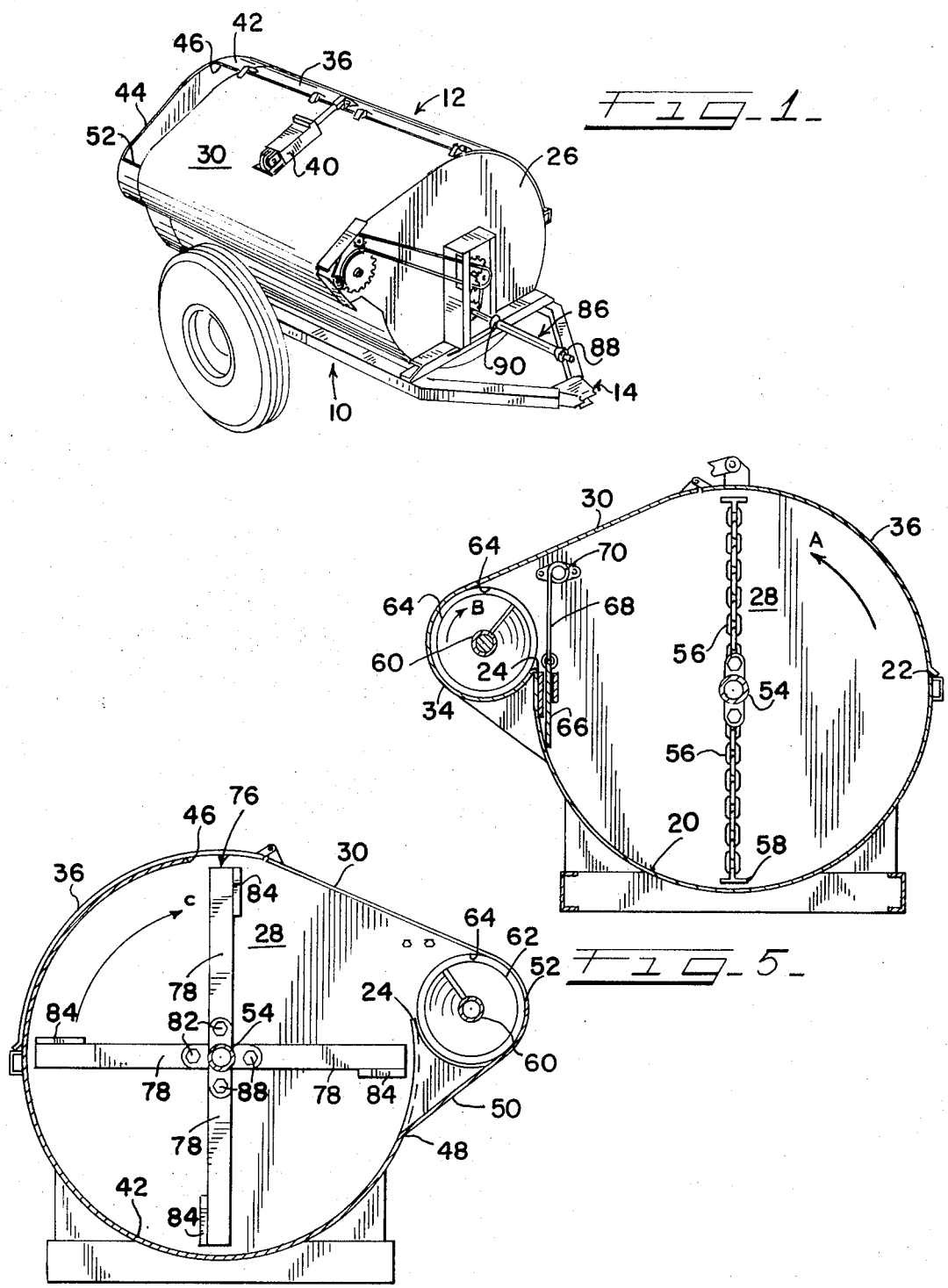
FIG. 1 is a perspective view of the spreader of the invention.
FIG. 5 is a fragmentary sectional view taken in the direction of arrows 5—5 of FIG. 3; and, FIG. 6 is a fragmentary sectional view taken in the direction of arrows 6—6 of FIG. 3.

Referring first to FIG. 1, there is shown a spreader having a wheeled frame 10 on which is mounted a housing 12 disposed longitudinally in the direction of travel of the spreader. The forward end of the frame 12 terminates in a clevis connection 14 adapted to be connected to the hitch structure of a tractor (not shown). In general, the housing 12 is divided into a material container 16 and a material discharge chamber 18 as shown generally in FIGS. 3 and 4.

The container 16 is defined by structure including a semi-cylindrical tank portion 20 disposed longitudinally on the frame 12 between the wheels. The tank portion 20 is arranged to define the bottom and opposite side walls of the container. The opposite side walls terminate in longitudinal parallel edges 22 and 24. The ends of the container 16 are defined by front and rear vertical end walls 26 and 28 respectively, secured to the opposite ends of the tank portion 20. As best shown in FIGS. 1 and 5, the container 16 is further defined by a top section 30 secured to the end walls 26 and 28. The section 30 terminates at its upper end in a longitudinally extending edge 32 and curves laterally outwardly and downwardly therefrom to where it merges into a trough 34 secured along the tank edge 24. A semi-cylindrical cover 36 is mounted by hinges 38 on the section 30 and extends from the edge 32 to the edge 22 when in a closed position. A hydraulic piston cylinder unit 40 is connected between the container section 30 and the cover 36 for pivoting the cover between open and closed positions as shown in dotted lines and solid lines respectively in FIG. 2.

As mentioned above, the housing 12 includes a discharge chamber 18. As best shown in FIGS. 3, 4 and 6, a semi-cylindrical section 42 is secured to the vertical wall 28 and extends rearwardly therefrom. A vertical end wall 44 is secured to the end of the section 42 as shown. The section 42 extends from an upper edge 46 to a point at 48 from which a ramp section 50 extends upwardly and outwardly terminating at an edge 52. It will thus be seen that an opening is defined by the edges 46 and 52 and the vertical walls 28 and 44.

The above-described container 16 is adapted to receive and carry the material to be spread. A rotary flail mechanism for unloading the material from the container will now be described. As best shown in FIG. 3, an elongated rotatable shaft 54 extends longitudinally through the center of the housing 12. The shaft 54 is journaled at its forward end by suitable bearings in the front wall 26. The shaft 54 extends through the wall 28 and is journaled at its rear end by suitable bearings in the wall 44. A plurality of flexible chains 56 is connected to the shaft 54 at spaced intervals along the portion of the shaft disposed between the walls 26 and 28. A T-shaped plate 58 is connected to the outer end of each chain 56. The chains 56 are shown in radially extended positions for convenience of illustration. It will, of course, be understood that the chains hang downwardly from the shaft 54 when the shaft is at rest. As will be subsequently be described in greater detail, rotation of the rotary flail structure throws the material over the side wall edge 24 and into the trough 34.

As shown in FIG. 4, an elongated rotatable shaft 60 is journaled by suitable bearings in the front wall 26 and rear wall 44 and extends along the center of the trough 34 in parallel relation to the shaft 54. A section of helical flighting 62 is secured to the shaft 60 along the portion disposed between the walls 26 and 28. As shown in FIGS. 5 and 6, a circular opening 64 is defined through the wall 28 concentrically about the shaft 60 and is of a diameter the same as that of the trough 34. It will thus be seen that the shaft 60 and helical flighting 62 comprise an auger conveyor for moving material along the trough 34, through the opening 64, and into the discharge chamber 18.

The spreader includes means for selectively varying the material-conveying capacity of the auger conveyor. As shown in FIGS. 4 and 5, a vertical plate 66 is disposed adjacent to the edge 24 and extends longitudinally from the wall 26 to the wall 28. The plate 66 is supported by a pair of flexible cables 68 secured to a shaft 70 mounted on the walls 26 and 28 above the plate. A crank 72 is secured to the forward end of the shaft 70 to provide means by which the operator can raise and lower the plate 66 relative to the auger conveyor. It will be seen that the load-conveying capacity is increased as the plate 66 is raised. A conventional pawl and ratchet assembly shown generally at 74 permits the position of the plate 66 to be fixed at any one of a plurality of levels within the range of adjustment.

A rotor structure is provided for throwing material from the discharge chamber 18 laterally outwardly onto the ground through the above-described discharge opening. As shown in FIGS. 3, 4 and 6, a plurality of arm assemblies 76 is mounted on the portion of the shaft 54 disposed between the walls 28 and 44. In the preferred embodiment of the invention, there are four such arm assemblies disposed in circumferentially spaced relation about the shaft. Each arm assembly 76 includes an elongated arm 78 secured at its inner end to a sleeve 80 which is pivotally received on a pin 82 secured on the shaft 54 as shown. A plate 84 is secured to the outer end of the arm 78 for engaging material within the chamber 18 and throwing the same from the chamber.

The mechanism for driving the above-described flail structure, auger conveyor, and rotor structure will now be described. The power is supplied from the usual PTO of the towing tractor. An extensible drive shaft 86, which includes universal joints 88 and 90, is connected at its forward end to the PTO of the tractor. The rear end of the driveshaft 86 is journaled on the spreader by two spaced bearing assemblies 92 and 94. A sprocket 96 is mounted on the shaft 86 between the bearing assemblies 92 and 94 as shown in FIG. 3. A larger diameter sprocket 98 is mounted on the shaft 54 and a flexible drive chain 100 is trained about the sprockets as shown in FIG. 2. It will thus be seen that power is transmitted to rotate the shaft 54 and the associated flail and rotor structures mounted thereon.

Power is transmitted to the auger conveyor by means best shown in FIG. 2. A large diameter sprocket 102 is keyed to the end of the auger shaft 60. A smaller diameter sprocket 104 is keyed to the end of the shaft 54 in coplanar relation to the sprocket 102. A flexible drive chain 106 is trained about the sprocket 104 and extends in engagement with a pair of idler sprockets 108 and 110 which are positioned relative to the sprocket 102 to provide a "back wrap" engagement with the sprocket 102 as shown. Accordingly, it will be seen that the auger conveyor is driven oppositely to the shaft 54.

In operation the cover 36 is swung to its open position and the material to be spread is loaded into the container 16. Upon closing the cover the spreader is towed to the unloading area where the PTO of the towing tractor is actuated to rotate the shaft 54 through the above-described shaft 86, sprocket 96, chain 100, and sprocket 98. Upon initial rotation of the shaft 54, the chains 56 wrap around the shaft. As the shaft continues to rotate, centrifugal force acts to extend the chains into engagement with the material next adjacent to the shaft. The plate members 58 dig into the material to shred the same and assist in reducing the material into segments small enough to be thrown by the flail structure. As best seen with reference to FIG. 5, the tank portion 20 and cover 36 are shaped to direct the material around the shaft and upwardly in the direction of arrow A. The top section 30 is arranged to direct the material into the trough 34.

Throughout the operation of the flail structure in unloading the material from the container 16, it will be seen that the auger conveyor in the trough 34 is rotated in the direction of arrow B to move the material therealong toward the discharge chamber 18. The drive mechanism for rotating the auger conveyor is shown in FIG. 2. As mentioned above, the material-conveying capacity of the auger conveyor may be adjusted by selectively fixing the height of the plate 66 relative to the auger conveyor.

The flighting 62 of the auger conveyor moves the material through the opening 64 at which point the material falls onto the ramp section 50 (FIG. 6) and into the discharge chamber 18. The arm assemblies 76 are rotated by the shaft 54 in the direction of arrow C to engage the material and throw the same laterally outwardly through the discharge opening defined between the edges 46 and 52.

Throughout the above-described unloading and spreading operation, it will be understood that the unloading capacity of the flail structure is more than enough to insure that the full load-conveying capacity of the auger conveyor will be maintained. Accordingly, the auger conveyor serves to deliver material into the discharge chamber at a relatively constant rate per any given speed of rotation. A metering function is thus provided which assists in providing a more uniform rate of material discharge from the discharge chamber. The ultimate result is a more uniform spread pattern of the material on the ground.

What is claimed is:

1. A material unloader, comprising:
   a mobile frame;
   a material-carrying container on said frame having a side wall terminating in an edge extending longitudinally of the container;
   a rotary flail structure disposed in said container for conveying the material over said edge;
   an auger conveyor disposed along said edge in material-receiving relation to said rotary flail structure for conveying the material toward an end of the auger conveyor;
   a chamber on said frame for receiving material from said end of said auger conveyor, said chamber including a discharge opening defined therein; and
   a rotor disposed in said chamber for discharging material through said discharge opening.

2. A material spreader adapted to be towed by a tractor, comprising:
   a mobile frame;
   a material-carrying container on said frame including a semi-cylindrical longitudinal portion defining the bottom and sides of the container, an end wall disposed at each end of the container;
   a rotatable shaft extending through said end walls longitudinally of the container;
   a plurality of flail elements on said shaft for conveying material over one of the sides of the container in response to rotation of said shaft;
   an auger conveyor extending longitudinally of said container adjacent to said one side thereof in material-receiving relation to said flail elements;
   a chamber on said frame adjacent to one of said end walls of said container for receiving material from said auger conveyor, said chamber including a discharge opening defined therein, said shaft extending into said chamber; and
   a rotor mounted on said shaft within said chamber for discharging material through said discharge opening in response to rotation of said shaft.

3. The subject matter of claim 2, including a plate disposed along said one side of said container adjacent to said auger conveyor, and means for vertically adjusting the position of said plate relative to said auger conveyor so as to vary the material-conveying capacity of the conveyor.

4. A material spreader, comprising:
   a mobile frame;
   an elongated container on said frame adapted to carry the material to be spread;
   a rotatable shaft extending through said container longitudinally thereof;
   a plurality of flexible flail elements mounted on said shaft for extension therefrom in response to rotation of said shaft to convey material in directions away from said shaft, said container including wall portions disposed about said shaft for directing the material from said flail elements in a path extending laterally toward one side of said container;
   an auger conveyor extending longitudinally of said container and disposed in the path of movement of the material for receiving the same from said flail elements;
   a chamber on said frame disposed for receiving material from said auger conveyor, said chamber including a discharge opening; and
   a rotor in said chamber for discharging material through said discharge opening, said rotor being coaxially disposed with said shaft.

5. A material spreader, comprising:
   a mobile frame;
   a chamber on said frame including a discharge opening;
   a rotor mounted within said chamber for discharging material through said opening;
   an auger conveyor disposed longitudinally of said frame and having a discharge end communicating with said chamber for delivering material into said chamber;
   a material-carrying container on said frame communicating with said auger conveyor; and
   a rotary flail structure disposed in said container for directing the material therein onto said auger conveyor, whereby the material is successively moved from said container along said auger conveyor into said chamber and then out of said chamber through said discharge opening.

6. The subject matter of claim 5, wherein said rotor and said rotary flail structure have coaxially disposed axes of rotation.

7. The subject matter of claim 5, wherein said auger conveyor is in material-receiving communication with said container along substantially the entire length of said auger conveyor.

8. A material unloader, comprising:
   a mobile frame;
   an elongated housing horizontally disposed on said frame, said housing including front and rear end walls closing the opposite ends thereof;
   a partition extending across said housing intermediate said end walls to define a material container on one side of said partition and a discharge chamber on the other side of said partition, said chamber including a discharge opening;
   an auger conveyor disposed along said container for conveying material therefrom into said chamber coaxially with said flail structure;
   a rotary flail structure in said container arranged to convey material onto said auger conveyor; and
   a rotary disposed in said chamber for discharging material through said discharge opening.

9. The subject matter of claim 8, including means for adjusting the conveying capacity of said auger conveyor.

10. The subject matter of claim 8, wherein said auger conveyor is rotatable about an axis extending parallel to the axis of rotation of said flail structure.

11. A material-receiving and conveying apparatus, comprising:
    a horizontally disposed semi-cylindrical tank defining a bottom wall and upwardly extending side walls, one of said side walls terminating in an edge extending longitudinally of the tank;

a rotary flail structure in said tank including a centrally disposed longitudinally extending rotatable shaft, a plurality of flexible flail elements secured to said shaft for extension therefrom upon rotation of said shaft to throw material over said edge of said tank; and a rotatable auger conveyor disposed along said edge in material-receiving relation to said flail structure for conveying material longitudinally of the tank.

12. The subject matter of claim 11, including means disposed along said edge for varying the material-conveying capacity of said auger conveyor.

13. The subject matter of claim 11, including means for rotating said flail structure and said auger conveyor in opposite directions relative to each other.

* * * * *